United States Patent
Amos et al.

(10) Patent No.: US 6,932,353 B2
(45) Date of Patent: Aug. 23, 2005

(54) BELLOWS SEAL

(75) Inventors: Peter G. Amos, Essex, CT (US); D. Gregory More, Middleton, CT (US); Ian W. Boston, Ennetbaden (CH)

(73) Assignee: Alstom Technology Ltd., Baden (CH)

( * ) Notice: Subject to any disclaimer, the term of this patent is extended or adjusted under 35 U.S.C. 154(b) by 185 days.

(21) Appl. No.: 10/636,685

(22) Filed: Aug. 8, 2003

(65) Prior Publication Data

US 2004/0066005 A1 Apr. 8, 2004

Related U.S. Application Data

(60) Provisional application No. 60/405,106, filed on Aug. 21, 2002.

(51) Int. Cl.[7] .............................................. H02G 15/04
(52) U.S. Cl. ...................... 277/602; 277/627; 277/647; 277/652
(58) Field of Search ................................. 277/602, 608, 277/627, 647, 652

(56) References Cited

U.S. PATENT DOCUMENTS 4,589,666 A  5/1986  Halling ........................ 277/200

6,648,333 B2 * 11/2003  Aksit et al. .................. 277/316

FOREIGN PATENT DOCUMENTS

EP  0 219 490 A2  4/1987
EP  0 219 490 A3  8/1988

OTHER PUBLICATIONS

Search Report from EP 02 40 6062 (Apr. 17, 2003).

* cited by examiner

*Primary Examiner*—Enoch Peavey
(74) *Attorney, Agent, or Firm*—Cermak & Kenealy, LLP; Adam J. Cermak

(57) ABSTRACT

A seal has a metallic body having a convoluted cross-section extending between first and second ends and a first generally interior surface extending between the first and second ends and a second generally exterior surface extending between the first and second ends. An adhesive is located in one or more locations on at least one of the surfaces, the adhesive holding the body in a longitudinally contracted condition. There are related methods of manufacture. In related methods of use, the adhesive is caused to release, allowing the seal to expand toward the relaxed condition.

20 Claims, 3 Drawing Sheets

BELLOWS SEAL

This application claims priority under 35 U.S.C. § 119(e) to U.S. provisional patent application No. 60/405,106, filed Aug. 21, 2002, the entirety of which is incorporated by reference herein.

BACKGROUND OF THE INVENTION (1) Field of the Invention

This invention relates to metallic seals, and more particularly to bellows seals.

(2) Description of the Related Art

A variety of metallic seal configurations exist. Key metallic seals are commonly held under compression between two opposed flanges of the elements being sealed to each other. Such metallic seals may be used in a variety of industrial applications.

Key examples of such metallic seals are of an annular configuration, having a convoluted radial section which permits the seal to act as a spring and maintain engagement with the flanges despite changes or variations in the flange separation. Certain such seals have an S-like section while others have a section similar to the Greek letter ϵ with diverging base and top portions. Other similar seals are formed with additional convolutions. One exemplary seal is sold by The Advanced Products Company, North Haven, Conn., as the E-RING seal. Such seals are commonly formed as a monolithic piece of stainless steel or superalloy. Such seals are commonly formed from sheet stock into a shape that is effective to provide the seal with a desired range of compressibility from a relaxed condition.

A particular application where a bellows seal cannot easily be used is in horizontally split gas turbine engines. Horizontally split gas turbine engines are formed in two halves and have a lower casing and an upper casing that can be bolted together once the rotating shaft and other components have been installed. Brush seals are well known to those skilled in the art and are used to provide a fluid-tight seal between a high-pressure region of the engine and a low-pressure region of the engine. Brush seals usually include an annular head portion that is coaxial with the shaft. A plurality of bristles extend from the head portion towards the shaft such that the ends of the bristles wipe against the surface of the shaft. For assembly purposes, a brush seal is normally formed from four separate brush seal segments each having ninety degrees of arc. To prevent bypass leakage from the high-pressure region of the engine to the low-pressure region of the engine the brush seals are normally made a tight fit in a groove provided in the lower and upper casings. This makes removal of the brush seals very difficult and leakage between the head portion and the groove is not well controlled. However, the specific construction of horizontally split gas turbines engines is such that it not possible to split the lower and upper casings vertically around the brush seal. This means that a spring seal cannot be used because it would have to be compressed before it could be inserted into a sealing channel provided between the head portion of the brush seal and a wall of the groove provided in the lower and upper casing.

BRIEF SUMMARY OF THE INVENTION

In one aspect, there is a method for providing a seal between two housing walls. A spring seal is provided having an uncompressed length greater than a separation between the two housing walls. An agent is applied to the spring seal, the agent having adhesive and strength properties when cured or set chosen so that it loses at least one of properties under certain predetermined conditions. A compressing force is applied to the spring seal so that it is has a compressed length less than the separation between the two walls. The applied force is maintained for a period effective to cure or set the adhesive sufficiently to permit the applied force to be withdrawn with the agent maintaining the seal in a compressed condition. The compressed spring seal is inserted between the two housings. The certain predetermined conditions are applied to the adhesive so that it loses the property sufficiently to cause the seal to relax and expand into sealing contact the two housing walls.

In various implementations, the adhesive may lose its adhesive properties when it is heated above a predetermined temperature. The predetermined temperature may be between 180 and 220 degrees C. or, more narrowly, 190 and 210 degrees C. The spring seal may be a bellows seal and may have a cross-section of more than 360 degrees of wave between sealing surfaces.

In another aspect, there is a seal. The seal has a metallic body having a convoluted cross-section extending between first and second ends and a first generally interior surface extending between the first and second ends and a second generally exterior surface extending between the first and second ends. An adhesive (e.g., an epoxy) is located in one or more locations on at least one of the surfaces, the adhesive holding the body in a longitudinally contracted condition (e.g., at a length no more than 95% of a relaxed length at like temperature (e.g., room temperature of 21 degrees C.).

In various implementations, the adhesive may have temperature dependent strength and/or adhesion properties such that when placed in an environment at a temperature at or above a threshold temperature the adhesive will permit the body to expand to substantially the relaxed length for such temperature within a predetermined time interval. At an exemplary interval (e.g., 100 seconds or less) and the threshold temperature may be at a convenient range (e.g., 100, 200, 300, 400, or 500 degrees C. ±10 degrees C.). The adhesive may be only on said first surface.

There are related methods of manufacture. In related methods of use, the adhesive is caused to release, allowing the seal to expand toward the relaxed condition, but being stopped in an intermediate sealing condition by engagement with elements to be sealed.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
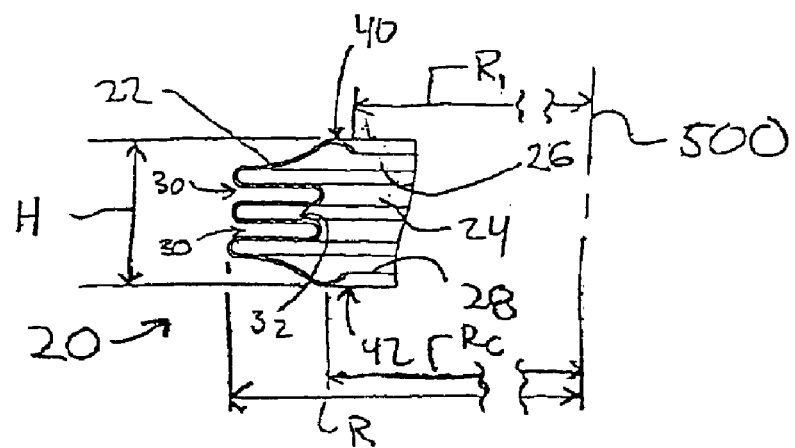
FIG. 1 is a partial longitudinal sectional view of an uncompressed seal body.

FIG. 1 shows a metallic seal body 20 having symmetry around a central longitudinal axis 500. The body has first and second surfaces 22 and 24 that, in this internally-pressurized example, are substantially exterior and interior surfaces, respectively. The axis would appear on the opposite side of the cross-section in an externally-pressurized example. The cross-section a would appear rotated by +/−ninety degrees in radial sealing applications. Linear and other sealing applications are also possible.

The surfaces 22 and 24 are separated by first and second end surfaces 26 and 28. The body is formed having a series of convolutions defining inwardly-directed spaces 30 and outwardly-directed spaces 32. Along a central portion of the body, the convolutions are regular, of even amplitude (relative to the axis 500). Toward the end surfaces 26 and 28, the body diverges radially inward. The body has first and second longitudinal extremes 40 and 42, which, in the illustrated embodiment, are annular longitudinally outboard facing portions of the surface 22 relatively close to the ends 26 and 28. The body has a maximum radius R and a contact radius radius $R_C$ at the locations 40 and 42. The exemplary body has a substantially constant thickness between the surfaces 22 and 24. The body has a minimum radius $R_I$. The body may be manufactured by myriad known or other techniques. Its convolutions may have various shapes and may be formed of various materials or combinations thereof (e.g., having platings, etc.). An exemplary body is formed of spring steel.

After the body is formed, it is advantageously cut longitudinally into a plurality of segments (e.g., 4×90°, 6×60°, or 8×45°). After this segmenting (or alternatively before) an adhesive agent may be applied to the body segments to ultimately hold the seal in a precompressed condition.

Figure 2:
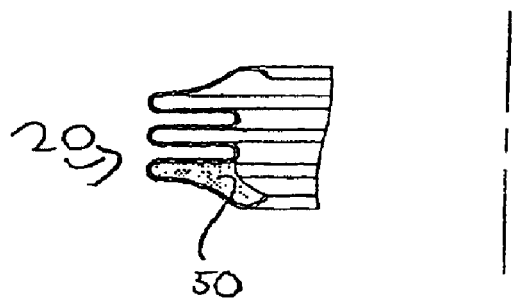
FIG. 2 is a partial longitudinal view of the uncompressed seal body of FIG. 1 with an adhesive thereon.

FIG. 2 shows a layer of adhesive 50 applied to one of the surfaces (24 in the exemplary embodiment). The adhesive may be applied over substantially the entire subject surface or only a portion or portions thereof. The portion or portions may be longitudinal portions or circumferential portions. In the exemplary embodiment, the adhesive is applied over a portion covering substantially the entire circumferential extent, but only along one of the interior spaces 32 (a space at one longitudinal extreme of the exemplary seal body). Exemplary adhesive is an epoxy. An exemplary epoxy is manufactured by Tra-Con, Inc., Bedford, Mass. under the brand name is Tra-Bond 2151. Tra-Bond 2151 is a thixotropic (smooth paste) heat conductive epoxy system that complies with the NASA Outgassing Specification. It is a two-part adhesive that forms a high strength bond at room temperature, it bonds readily to itself and to metals, silica, stealite, alumina, sapphire, ceramics glass and many other materials. Tra-Bond 2151 provides excellent resistance to salt solutions, mild alkalis, and many other chemicals including petroleum solvents, lubricating oils, and alcohol.

Tra-Bond 2151 Properties:

| Color | Blue |
|---|---|
| Specific gravity, mixed | 2.300 |
| Viscosity, cps, mixed | 40,000 |
| Operating temperature range ° C. | −70 to 115 |
| Hardness, Shore D | 90 |
| Thermal Conductivity W/M*K | 9.5E−01 |
| Lap Shear, alum to alum, psi | 2,850 |
| Glass Transition (Tg) ° C. | 60 |
| Tensile strength, psi | 7,500 |

The adhesive may be dispensed at room temperature (e.g., 21° C.) with the seal in its free uncompressed state.

Figure 3:
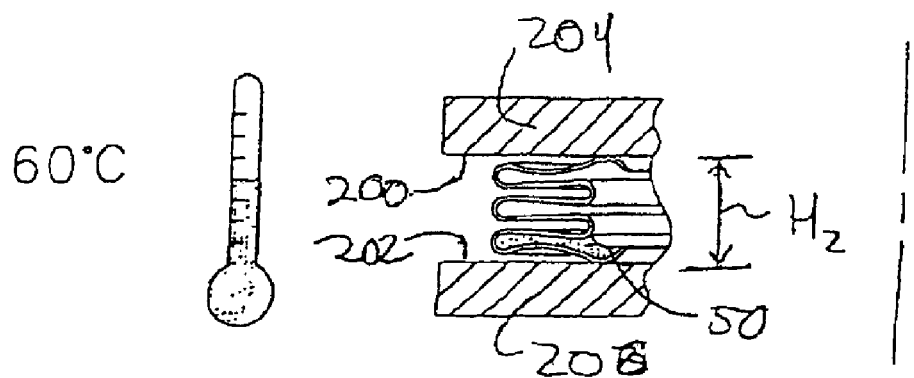
FIG. 3 is a partial longitudinal sectional view of the seal of FIG. 2 in a compression fixture.

With the epoxy applied, the seal segments are compressed to a height $H_2$ (FIG. 3), bringing longitudinally adjacent portions of the surface 24 closer together, including portions joined by the adhesive 50. The compressive force may be applied and maintained by contact of surfaces 200 and 202 of plates 204 and 206 of a fixture with the seal portions 40 and 42. With the compression maintained, the adhesive is allowed to harden or cure. In the exemplary embodiment, the adhesive is cured at an elevated temperature (e.g., 65° C.±5° C. for 2.5 hours). During this hardening/curing, the height is advantageously maintained at $H_2$, although it is possible, depending upon the nature of the fixture, that this could vary (e.g., if the fixture supplied a constant force rather than a constant height). Alternatively, the body may be compressed before adhesive application.

Figure 4:
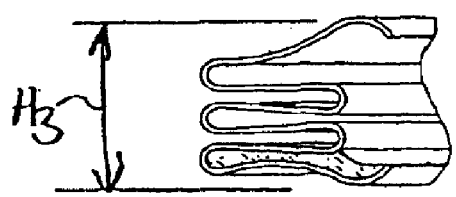
FIG. 4 is a partial longitudinal sectional view of the seal of FIG. 2 upon release from the fixture.

The seal segments are then released from the fixture, whereupon they may expand to a height $H_3$ (FIG. 4). This expansion will be associated with relaxation of the segments along portions not adhered to adjacent portions. At room temperature, this height will be less than the original room temperature height H. The adhered portions of the seal will be held in a compressed, strained condition via the tensile strength of the adhesive. An exemplary seal exerts an outward sealing stress in the region of 1000 lbs/in$^2$ and a typical tensile bonding strength for the adhesive would be in the region of 4500 lbs/in$^2$.

Figure 5:
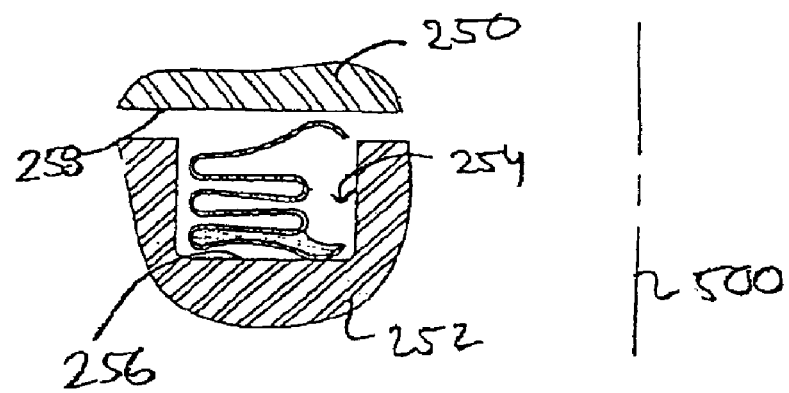
FIG. 5 is a partial longitudinal sectional view of the seal of FIG. 4 upon insertion between housing members.
Figure 6:
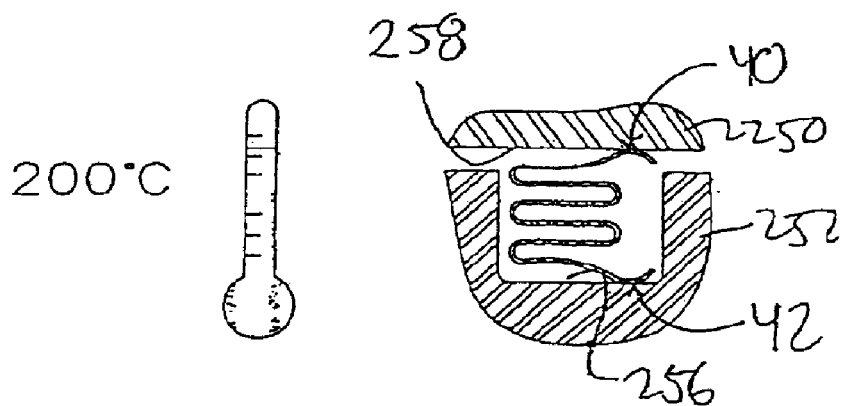
FIG. 6 is a partial longitudinal sectional view of the seal of FIG. 5 upon release of the adhesive.

The seal segments are then placed between the elements being sealed. FIG. 5 shows two elements 250 and 252. In one example, these are housing portions of a horizontally split gas turbine engine. In one example, the element 252 has an annular longitudinally open channel 254 having a base surface 256 facing a surface 258 of the element 250. The element 252 may be a structural portion of the housing or may be a head portion of a brush seal element being augmented by the precompressed bellows seal. The segments are inserted such as through a longitudinal split or other gap in the channel. After all segments are inserted and any final assembly of the housing, the turbine may be run. Running of the turbine will heat the seal. Once the seal reaches a threshold temperature (or such a threshold temperature for a threshold time), the adhesive will lose its ability to maintain the seal in the precompressed condition. For example, the adhesive may deform such as via plastic flow or may release from portions of the body surface. At this point, the seal will expand and contacting portions 40 and 42 will respectively contact the surfaces 258 and 256 (FIG. 6) to seal the elements 250 and 252 (subject to possible blow-by between the seal segments). Ultimately, the adhesive may be entirely vaporized or burned off.

Gas turbine engines typically have operating temperatures of about 400° C. and above and this will be sufficient to heat the adhesive to a threshold temperature above 200° C. The adhesive will therefore lose its adhesive properties the first time the gas turbine engine approaches its normal operating temperature. Alternatively, to heat the adhesive the complete housing/seal assembly can be placed inside an industrial heating means such as a furnace or oven.

Advantageously, the separation between surfaces 256 and 258 is less than the relaxed seal temperature under all anticipated conditions so that the seal is maintained in compressive engagement maintaining a longitudinal sealing force between the surfaces. For example, if the engine is turned off and allowed to cool to room temperature, the separation will still be less than H.

One or more embodiments of the present invention have been described. Nevertheless, it will be understood that various modifications may be made without departing from the spirit and scope of the invention. For example, the particular application will influence many of the seal properties. Additionally, other release mechanisms may be possible (e.g., irradiation/light exposure at a particular frequency, sonic exposure at a particular frequency, chemical application (e.g., solvent)). Accordingly, other embodiments are within the scope of the following claims.

What is claimed is:

1. A method for providing a seal between two housing walls comprising:
   providing a spring seal having an uncompressed length greater than a separation between the two housing walls;
   applying to the spring seal an agent having adhesive and strength properties when cured or set chosen so that it loses at least one of said properties under certain predetermined conditions;
   applying a compressing force to the spring seal so that it is has a compressed length less than the separation between the two housings;
   maintaining applied force for a period effective to cure or set the adhesive sufficiently to permit the applied force to be withdrawn with the agent maintaining the seal in a compressed condition;
   withdrawing the applied force;
   inserting the compressed spring seal between the two housings; and
   applying the certain predetermined conditions to the adhesive so that it loses said at least one property sufficiently to cause the seal to relax and expand into sealing contact the two housing walls.

2. A method according to claim 1, wherein the adhesive loses its adhesive properties when it is heated above a predetermined temperature.

3. A method according to claim 2, wherein the predetermined temperature is between 180 and 220 degrees C.

4. A method according to claim 3, wherein the predetermined temperature is between 190 and 210 degrees C.

5. A method according to claim 1, wherein the spring seal comprises a bellows seal having a cross-section of more than 360 degrees of wave between sealing surfaces.

6. A seal comprising:
   a metallic body having a convoluted cross section extending between first and second ends and a first generally interior surface extending between said first and second ends and a second generally exterior surface extending between said first and second ends; and
   an adhesive in one or more locations on at least one of the surfaces, the adhesive holding the body in a longitudinally contracted condition of a length no more than 95% of a relaxed length at like temperature.

7. The seal of claim 6 at a temperature of 21° C.

8. The seal of claim 7 wherein said adhesive has temperature-dependent strength, adhesion properties, or both, such that when placed in an environment at a temperature at or above a threshold temperature the adhesive will permit the body to expand to substantially the relaxed length for such temperature within a predetermined time interval.

9. The seal of claim 8 wherein said interval is no more than 100 seconds and said threshold temperature is 200±10° C.

10. The seal of claim 8 wherein said interval is no more than 100 seconds and said threshold temperature is 500±10° C.

11. The seal of claim 8 wherein said interval is no more than 100 seconds and said threshold temperature is 300±10° C.

12. The seal of claim 8 wherein said interval is no more than 100 seconds and said threshold temperature is 100±10° C.

13. The seal of claim 6 wherein said adhesive is only on said first surface.

14. The seal of claim 6 wherein said adhesive comprises an epoxy.

15. A method for the manufacture of the seal of claim 6 comprising:
   applying said adhesive;
   longitudinally compressing said body;
   holding said body compressed until the adhesive has sufficient strength to maintain said longitudinally contracted condition; and
   releasing said compression.

16. The method of claim 15 wherein:
   the compressing occurs before the applying; and
   there is substantially no expansion of the seal upon said releasing.

17. A method for use of the seal of claim 6 comprising:
   inserting the seal into a gap between two sealing surfaces so that the seal is not compressed therebetween; and
   heating the seal to a threshold temperature whereupon the seal body relaxes into compressive engagement between the sealing surfaces.

18. The method of claim 17 wherein:
   the inserting comprises installation between elements of a turbine housing; and
   the heating comprises running said turbine.

19. The method of claim 17 further comprising allowing the seal to return to a temperature of less than 30° C. with the seal maintaining said compressive engagement.

20. The method of claim 15 wherein:
   the body is first formed as an annulus of convoluted longitudinal section; and
   then the annulus is cut into a plurality of equal segments prior to said compressing and said applying.

* * * * *